(12) United States Patent
Takaoka et al.

(10) Patent No.: US 8,163,217 B2
(45) Date of Patent: Apr. 24, 2012

(54) METHOD OF MAKING HEAT-RESISTANT TRANSPARENT CONTAINER

(75) Inventors: Shigeru Takaoka, Osaka (JP); Hiroshi Shibano, Osaka (JP); Jun Kawata, Osaka (JP)

(73) Assignee: Nakamoto Packs Co., Ltd., Osaka (JP)

( * ) Notice: Subject to any disclaimer, the term of this patent is extended or adjusted under 35 U.S.C. 154(b) by 51 days.

(21) Appl. No.: 11/811,894

(22) Filed: Jun. 12, 2007

(65) Prior Publication Data

US 2008/0042318 A1 Feb. 21, 2008

(30) Foreign Application Priority Data

Jun. 19, 2006 (JP) .................................. 2006-168961

(51) Int. Cl.
*B29C 71/00* (2006.01)

(52) U.S. Cl. ............... 264/235.6; 264/210.5; 264/210.7; 264/288.8; 264/290.2; 264/291; 264/345; 264/346; 264/544; 264/550

(58) Field of Classification Search .................. 264/291, 264/544, 210.5, 210.7, 235.6, 235.8, 288.8, 264/290.2, 345, 346, 550

See application file for complete search history.

(56) References Cited

U.S. PATENT DOCUMENTS

| | | | | |
|---|---|---|---|---|
| 3,429,854 A | * | 2/1969 | Rein et al. | 264/547 |
| 3,496,143 A | * | 2/1970 | Rein et al. | 264/544 |
| 4,073,857 A | * | 2/1978 | Arakawa | 264/291 |
| 5,409,750 A | * | 4/1995 | Hamada et al. | 428/35.7 |
| 5,445,784 A | * | 8/1995 | Sugiura et al. | 264/521 |
| 5,843,545 A | * | 12/1998 | Prince | 428/36.92 |
| 6,426,128 B1 | * | 7/2002 | Kimmel et al. | 428/1.6 |
| 6,534,574 B1 | * | 3/2003 | Zhao et al. | 524/284 |

* cited by examiner

*Primary Examiner* — Robert J Hill, Jr.
*Assistant Examiner* — Ninh V Le
(74) *Attorney, Agent, or Firm* — Flynn, Thiel, Boutell & Tanis, P.C.

(57) ABSTRACT

This invention relates to a method of making a heat-resistant transparent container which involves the steps of:
- a primary stretching and heat-setting process wherein an amorphous polyethylene terephthalate sheet is heated, primarily stretched and then primarily heat-set and
- a secondary stretching and heat-setting process wherein the sheet treated in the primary stretching and heat-setting process is molded with heating in a mold of a thermoforming machine while secondary stretching is performed, followed by secondary heat-setting in the same mold.

3 Claims, 2 Drawing Sheets

METHOD OF MAKING HEAT-RESISTANT TRANSPARENT CONTAINER

FIELD OF THE INVENTION

This invention relates to heat-resistant transparent containers, especially food containers for convenience stores etc., wherein food is placed therein and sold, or for retort sterilization and, more particularly, relates to heat-resistant transparent containers having a heat-resistance without deformation, even at 150° C. reached by heating foods containing oils by a microwave oven or at 125° C., which is a retort sterilization temperature, and having an excellent transparency.

BACKGROUND OF THE INVENTION

In food shops in convenience stores, department stores, super markets, etc., foods, such as daily dishes, noodles and salads, are placed in food containers, e.g., tray, cup or bowl, and sold. Such a food container is composed of a container body and a cover. The container body is, in general, manufactured by thermoforming a sheet of polypropylene, formed polypropylene, filler-containing polypropylene, polyethylene, foamed polyethylene, formed polystyrene, formed heat-resistant polystyrene, amorphous polyethylene terephthalate (A-PET), etc, by a vacuum forming machine, a pressure-forming machine or a vacuum-pressure-forming machine. The cover is formed from a sheet, such as A-PET, biaxially oriented polystyrene (OPS) or polypropylene (PP) (JP2005-329972A).

Recently, it is frequently conducted that foods packaged in a food container are bought and heated as it is by a microwave oven. When foods containing oils are heated together with the food container by a microwave oven, the temperature of the foods is raised to around 150° C. Accordingly, food containers are required to have a high heat resistance up to 150° C. Even in the case of food not containing oils, food containers for retort foods are required to resist a retort sterilization temperature of 125° C. Furthermore, food containers are desired to have a high transparency so that the foods packaged therein can be appreciated clearly at a look and can improve the commercial value thereof.

However, none of the above-mentioned conventional sheets have both a high heat-resistance and a high transparency. That is, A-PET and OPS have a high transparency, but do not have a high heat-resistance and soften at around 80° C. A PP sheet has a high heat-resistance but is inferior in transparency.

SUMMARY OF THE INVENTION

It is an object of the invention to provide a food container having a high transparency and a high heat resistance.

The inventors investigated eagerly in order to solve the above problems and noted that A-PET and OPS sheets have a high transparency. However, an OPS sheet has problems of safety and hygiene caused by the elution of residual monomers, dimers and trimers and additives. Then, they examined to improve the heat resistance of A-PET which is excellent in safety and hygiene for food.

As a result of investigations, they found that a high heat-resistance capable of resisting a temperature of 150° C. can be imparted to A-PET by crystallization through stretching and heat-setting to complete the invention.

Thus, this invention provides a method of making a heat-resistant transparent container which comprises:

a primary stretching and heat-setting process wherein an amorphous polyethylene terephthalate sheet is heated, primarily stretched and then primarily heat-set, and a secondary stretching and heat-setting process wherein the sheet treated in the primary stretching and heat-setting process is molded with heating in a mold of a thermoforming machine while secondary stretching is performed followed by secondary heat-setting in the same mold.

In the invention, in the primary stretching and heat-setting process, the crystallinity of the A-PET sheet is raised within the range capable of thermoforming, and in the secondary stretching and heat-setting process, the sheet treated in the primary stretching and heat-setting process is molded into a shape of a container and the crystallinity is further raised to improve its heat resistance. Besides, in the primary stretching and heat-setting process, since the A-PET sheet is stretched followed by heat-setting, a cheap apparatus can be applied. In the secondary stretching and heat-setting process, since a clear and heat-resistant molded body can be obtained by heat-setting in the same mold, the apparatus therefor is cheap due to not conducting double molding. Moreover, the molding time can be shortened to raise productivity.

Figure 1:
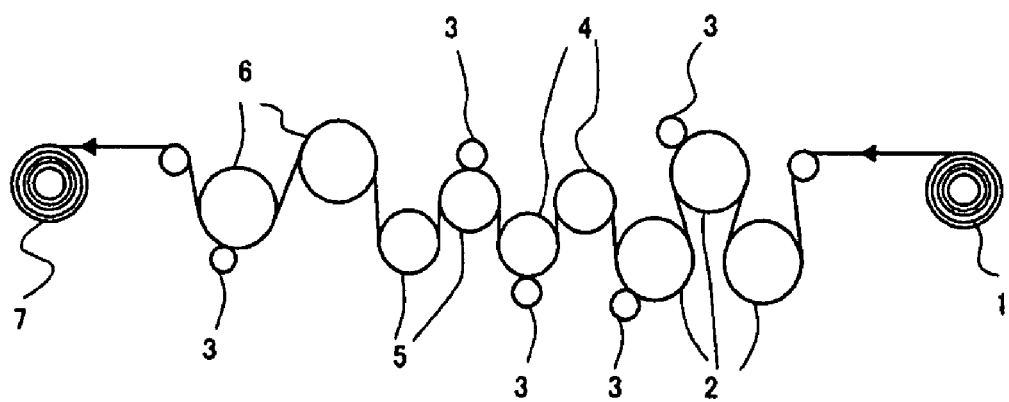
FIG. 1 is a schematic illustration of an apparatus for manufacturing a longitudinally uniaxially stretched A-PET sheet.

1 . . . A-PET sheet
2 . . . Preheating roll
3 . . . Nip roll
4 . . . Heating roll
5 . . . Stretching roll
6 . . . Heat-setting roll
7 . . . Longitudinally uniaxially stretched A-PET sheet
11 . . . Upper heating plate
12 . . . Lower heating plate
13 . . . Upper mold
14 . . . Lower mold
15 . . . Embedded heater
16 . . . Thermoformed article

DETAILED DESCRIPTION OF THE INVENTION

The amorphous polyethylene terephthalate (A-PET) sheet is fundamentally in a non-(or slightly) crystalline state having a crystallinity of approximately 5 to 7%. The A-PET sheet is not stretched and is commercially available. A typical thickness of the A-PET sheet is 0.2 to 1.5 mm, particularly 0.3 to 1.0 mm, though it varies according to the container to be made. Although the resin of the A-PET sheet is not required to have a high intrinsic viscosity, when the intrinsic viscosity of the resin is 0.6 dl/g or less or the resin is obtained from flakes of recovered PET bottles, it is possible that the surface conditions are not good. In these cases, a pretreatment is necessary.

In the primary stretching and heat-setting process, the A-PET sheet is heated and primarily stretched by uniaxial stretching. The A-PET sheet may be either previously molded (stocks) or molded in-line by a T-die molding machine.

A suitable stretching temperature (surface temperature of the A-PET sheet) in the primary stretching is in the range from 90 to 120° C., preferably 95 to 110° C. When the stretching temperature is lower than 90° C., the tension load is great while stretching the A-PET sheet and the thickness of the stretched A-PET sheet tends to be not uniform due to uneven stretching. When the stretching temperature exceeds 120° C., the sheet is whitened and surface roughening also occurs.

A suitable draw ratio is 2 to 5 times, preferably 2.6 to 3.7 times. When the draw ratio is less than twice, a cold crystallization point is observed in the measurement by a differential scanning calorimeter (DSC), the crystallinity becomes less than 22% and a thermoformed article formed in the later thermoforming process is whitened. When the draw ratio exceeds 5 times, slip tends to occur on the stretching roll during stretching and lateral wave patterns are generated by the presence of slipped portions and non-slipped portions.

A typical stretching apparatus is a uniaxial stretching apparatus using heating rolls, which may be a single-step stretching in a short range or multiple step stretching of two or more steps.

The primary heat-setting temperature is not specifically limited, but in view of the relaxation of orientation by annealing, a preferred temperature is higher than the stretching temperature by 5 to 20° C. When the heat-setting temperature is lower than the above range, i.e., not higher than the stretching temperature plus 5° C., the heat shrinkage of the sheet is great. When the heat-setting temperature is higher than the above range, i.e., exceeding the stretching temperature plus 20° C., surface roughening occurs to slightly whiten the sheet. A more preferable temperature range is the stretching temperature plus 5° C. to 15° C., because the heat shrinkage is too small to render deformation during molding of the thermoformed body.

The heat-setting time is usually 1.5 to 2.0 seconds, preferably 2 to 15 seconds. In order to meet the relaxation of orientation of the sheet, the rotational speed of the heat-setting roll is made slower than the stretching roll by about 0.5 to 10%.

Such a primarily stretched A-PET sheet after the primary heat-setting preferably has a crystallinity of 22% or more and less than 30%. With a crystallinity of less than 22%, since a cold crystallization point exists, the sheet possibly whitens upon heating during the secondary stretching. When exceeding 30%, thermoforming is made difficult to degrade the reproducibility. The crystallinity is represented by the formula:

$$\text{crystallinity}(\%) = \frac{\left(\begin{array}{c}\text{quantity of heat of}\\\text{fusion per mole}\end{array}\right) - \left(\begin{array}{c}\text{quantity of heat of cold}\\\text{crystallization per mole}\end{array}\right)}{\text{quantity of heat of fusion of perfect crystal } PET \text{ per mole } (26.9 \, kj)} \times 100$$

The sheet treated in the primary stretching and heat-setting process desirably has a crystallinity of 22% or more and less than 30%. By rendering the crystallinity in the above range, thermoforming in the secondary process can be achieved smoothly and the crystallinity is brought close to the range of 30% or more where a high heat resistance is obtained in the secondary stretching and heat-setting process.

In the secondary stretching and heat-setting process, the sheet treated in the primary stretching and heat-setting process is molded with heating in a mold of a thermoforming machine while secondary stretching is performed, followed by secondary heat-setting in the same mold.

The second stretching is practiced while molding. A suitable secondary stretching temperature, i.e. molding temperature, is 80 to 130° C., preferably 90 to 120° C. When the stretching temperature is lower than 80° C., waviness occurs on thermoformed articles. When the stretching temperature exceeds 130° C., drawdown of the sheet increases to generate wrinkles on the thermoformed articles.

The type of thermoforming machine may be a vacuum-molding type, pressure-forming-type or vacuum-pressure-forming type.

After molding in the mold, heat-setting is carried out in the same mold. A suitable temperature for the secondary heat-setting is 160° C. or higher, preferably 170° C. or higher. When the heat-setting temperature is lower than 160° C., it is liable to not ensure heat resistance at 150° C. Although there is no upper limit to the heat-setting temperature, when heat-setting is carried out at a temperature higher than 220° C. for a long time, thermoformed articles are liable to whiten and become translucent.

The heat-setting time in the mold is 7 seconds or more, preferably 10 seconds or more. When the heat-setting time is shorter than 7 seconds, wave-formed wrinkles tend to occur on the molded article.

It is necessary that the A-PET sheet treated in the secondary stretching and heat-setting process, which is a thermoformed article, has a crystallinity of 30% or more for imparting a heat resistance to 150° C. Thermoformed articles having a crystallinity of less than 30% are inferior in heat resistance. The crystallinity of 30% or more can be achieved while keeping a good transparency by molding the sheet treated in the primary stretching and heat-setting process at a temperature of 80 to 130° C. while secondary stretching is carried out and then heat-setting at a temperature of 160° C. or more.

The heat-resistant transparent container of the invention can be applied to various containers of which heat resistance and transparency are required, and is suitable for food containers, especially for food containers heated by a microwave oven or for retort food containers.

A process for manufacturing the heat-resistant transparent container according to the invention will be explained with reference to the drawings.

In FIG. 1, A-PET sheet 1 is delivered from its storage roll, and preheated to 70 to 90° C. while passing preheating rolls 2 nipped by nip rolls 3. Then, the sheet 1 is further heated to 90 to 120° C. by heating rolls 4 nipped by nip rolls 3, and stretched 2 to 5 times by stretching rolls 5 in the longitudinal direction. The uniaxially stretched A-PET sheet 1 is heated by heat-setting rolls 6 to a temperature higher than the temperature heated by heating rolls 4 by 5 to 20° C. to be heat-set to complete a longitudinally uniaxially stretched A-PET sheet 7.

Figure 2:
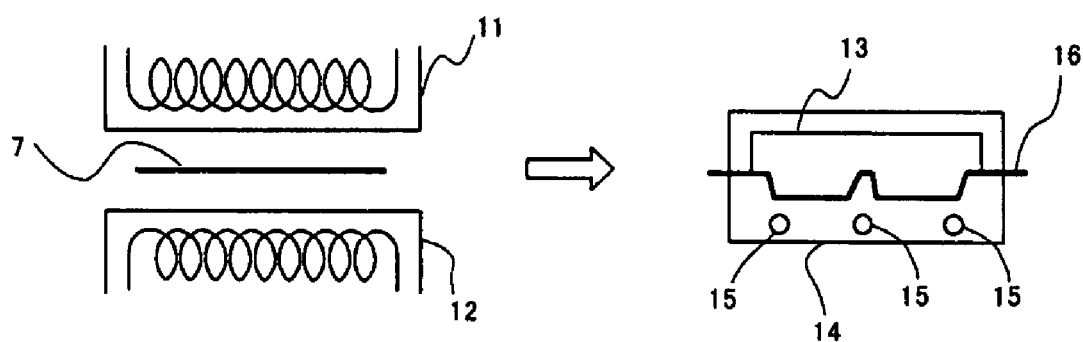
FIG. 2 is a schematic illustration of a thermoforming apparatus.
Figure 3:
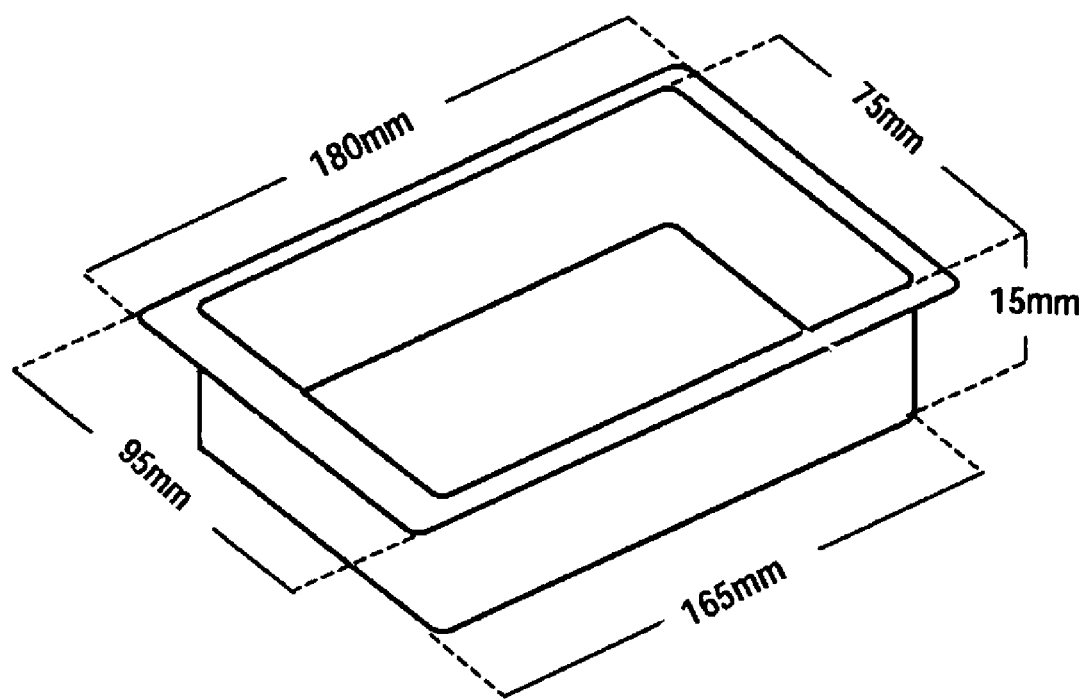
FIG. 3 is a perspective view of a thermoformed article.

As shown in FIG. 2, the longitudinally uniaxially stretched A-PET sheet 7 is located between upper heating plate 11 and lower heating plate 12 to be heated to 80 to 130° C. as the surface temperature of the sheet, and thermoformed by pressing by upper mold 13 and lower mold 14. The thermoformed sheet is kept for 10 seconds in the pressed state, and then taken out. Since lower mold 14 is heated by embedded heaters 15 to 160° C. or more, the thermoformed article 16 is heat-set at 160° C. A thermoformed article is shown in FIG. 3.

EXAMPLES

Example 1

An A-PET sheet 0.4 mm thick (crystallinity: 6.1%, manufactured by ATHENA-KOGYO Co., Ltd.) was stretched by a roll-type uniaxially stretching machine ("T-17" type, manufactured by NIPPON SEIKO SHO, Ltd.). The stretching conditions were set to the preheating roll temperature at 80° C., the heating roll temperature (stretching temperature) at 95° C., the stretching roll temperature at 80° C. and the heat-setting roll temperature at 100° C. The A-PET sheet was delivered at a speed of 3 m/mim., and stretched 2.6 times by the stretching rolls 5. The stretched sheet was heat-set for 10.5 seconds while passing through the heat-setting rolls 6 to obtain a stretched A-PET sheet 0.15 mm thick.

The stretched A-PET sheet was transparent and had no wrinkles. The crystallinity determined by a differential scanning calorimeter (DSC) was 24% and no cold crystallization peak was observed.

Subsequently, the stretched A-PET sheet was heated by heaters so that the surface temperature became 90° C. The softened stretched A-PET sheet was molded by vacuum-pressure forming using a vacuum-pressure forming machine ("FKC" type, manufactured by ASANO LABORATORIES, Ltd.) at an air pressure of 0.5 MPa. The served mold was a cavity-type aluminum mold having an upper diameter of 180 mm×95 mm, a bottom diameter of 165 mm×75 mm and a depth of 15 mm, and the temperature of the aluminum mold was set at 180° C. The heat setting time was 10 seconds.

The thermoformed article kept the transparency of the stretched A-PET sheet, and had a shape in accordance with the mold without deformation. The crystallinity was 30.5%.

The thermoformed article was subjected to heat resistance test by microwave oven heating. In the heat resistance test, a pork cutlet was put on the thermoformed article, and heated by a microwave oven ("National NE-EZ2") at 700 W for 3 minutes. The surface temperature of the heated pork cutlet was measured by an infrared radiant thermometer ("SATO SK-8700II"), and found to be 157° C. Oils pooled at the bottom of the thermoformed article. The thermoformed article was kept transparent without deformation.

Example 2

An A-PET sheet 0.6 mm thick (crystallinity: 6.3%, manufactured by ATHENA-KOGYO Co., Ltd.) was stretched by the same stretching machine under the same conditions as Example 1, except that the draw ratio was 3 times to obtain a stretched A-PET sheet 0.2 mm thick.

The stretched A-PET sheet was transparent and had no wrinkles. The crystallinity determined by DSC was 28.9%, and no cold crystallization peak was observed.

Subsequently, the stretched A-PET sheet was molded by vacuum-pressure forming using the same apparatus and the same conditions as Example 1 to obtain a thermoformed article.

The thermoformed article kept the transparency of the stretched A-PET sheet, and had a shape in accordance with the mold without deformation. The crystallinity was 34.2%.

The thermoformed article was subjected to a heat resistance test under the same conditions as Example 1 and it was found that the thermoformed article was kept transparent without deformation.

Example 3

The same A-PET sheet 0.6 mm thick (crystallinity: 6.3%, manufactured by ATHENA-KOGYO Co., Ltd.) as Example 2 was stretched by the same stretching machine under the same conditions as Example 1, except that the draw ratio was 3.7 times to obtain a stretched A-PET sheet 0.16 mm thick.

The stretched A-PET sheet was transparent and had no wrinkles. The crystallinity determined by DSC was 29.1% and no cold crystallization peak was observed.

Subsequently, the stretched A-PET sheet was molded by vacuum-pressure forming using the same apparatus and the same conditions as Example 1 to obtain a thermoformed article.

The thermoformed article kept the transparency of the stretched A-PET sheet, and had a shape in accordance with the mold without deformation. The crystallinity was 34.6%.

The thermoformed article was subjected to a heat resistance test under the same conditions as Example 1 and it was found that the thermoformed article was kept transparent without deformation.

Example 4

The same stretched A-PET sheet as Example 2 was used.

The stretched A-PET sheet was molded by vacuum-pressure forming using the same apparatus and the same conditions as Example 1, except that the heat-setting time in the mold was changed to 7.5 seconds, to obtain a thermoformed article.

The thermoformed article kept the transparency of the stretched A-PET sheet. Although a slight waviness was observed on a side wall, it was not a problem to affect the commercial value. The crystallinity was 34.0%.

The thermoformed article was subjected to a heat resistance test under the same conditions as Example 1 and it was found that the thermoformed article was kept transparent without deformation.

Example 5

The same stretched A-PET sheet as Example 2 was used.

The stretched A-PET sheet was molded by vacuum-pressure forming using the same apparatus and the same conditions as Example 1, except that the surface temperature heated by the heaters was changed to 110° C., to obtain a thermoformed article.

The thermoformed article kept the transparency of the stretched A-PET sheet, and had a shape in accordance with the mold without deformation. The crystallinity was 34.2%.

The thermoformed article was subjected to a heat resistance test under the same conditions as Example 1 and it was found that the thermoformed article was kept transparent without deformation.

Example 6

The same stretched A-PET sheet as Example 2 was used.

The stretched A-PET sheet was molded by vacuum-pressure forming using the same apparatus and the same conditions as Example 1, except that the heat-setting temperature in the mold was changed to 200° C., to obtain a thermoformed article.

The thermoformed article kept the transparency of the stretched A-PET sheet, and had a shape in accordance with the mold without deformation. The crystallinity was 34.9%.

The thermoformed article was subjected to a heat resistance test under the same conditions as Example 1 and it was found that the thermoformed article was kept transparent without deformation.

Example 7

The same stretched A-PET sheet as Example 2 was used. The stretched A-PET sheet was molded by vacuum-pressure forming using the same apparatus and the same conditions as Example 1, except that the heat-setting temperature in the mold was changed to 200° C., and the heat-setting time in the mold was changed to 7.5 seconds, to obtain a thermoformed article.

The thermoformed article kept the transparency of the stretched A-PET sheet. Although a slight waviness was observed on a side wall, it was not a problem that affected the commercial value. The crystallinity was 33.8%.

The thermoformed article was subjected to a heat resistance test under the same conditions as Example 1 and it was found that the thermoformed article was kept transparent without deformation.

Example 8

The same stretched A-PET sheet as Example 2 was used.

The stretched A-PET sheet was molded by vacuum-pressure forming using the same apparatus and the same conditions as Example 1, except that the heat-setting temperature in the mold was changed to 170° C. and the heat-setting time in the mold was changed to 12 seconds, to obtain a thermoformed article.

The thermoformed article kept the transparency of the stretched A-PET sheet, and had a shape in accordance with the mold without deformation. The crystallinity was 32.5%.

The thermoformed article was subjected to a heat resistance test under the same conditions as Example 1 and it was found that the thermoformed article was kept transparent without deformation.

Example 9

The same stretched A-PET sheet as Example 2 was used.

The stretched A-PET sheet was molded by vacuum-pressure forming using the same apparatus and the same conditions as Example 1, except that the surface temperature heated by the heaters was changed to 90° C. and the heat-setting temperature in the mold was changed to 170° C. and the heat-setting time in the mold was changed to 10 seconds, to obtain a thermoformed article.

The thermoformed article kept the transparency of the stretched A-PET sheet, and had a shape in accordance with the mold without deformation. The crystallinity was 32.0%.

The thermoformed article was subjected to a heat resistance test under the same conditions as Example 1 and it was found that the thermoformed article was kept transparent without deformation.

Example 10

The same A-PET sheet 0.6 mm thick (crystallinity: 6.3%, manufactured by ATHENA-KOGYO Co., Ltd.) as Example 2 was stretched by the same stretching machine under the same conditions as Example 1, except that the stretching temperature was 110° C., the heat-setting roll temperature was 115° C., and the draw ratio was 3 times to obtain a stretched A-PET sheet 0.2 mm thick.

The stretched A-PET sheet was transparent and had no wrinkles. The crystallinity determined by DSC was 28.0% and no cold crystallization peak was observed.

The stretched A-PET sheet was molded by vacuum-pressure forming using the same apparatus and the same conditions as Example 1 to obtain a thermoformed article.

The thermoformed article kept the transparency of the stretched A-PET sheet, and had a shape in accordance with the mold without deformation. The crystallinity was 33.0%.

The thermoformed article was subjected to a heat resistance test under the same conditions as Example 1 and it was found that the thermoformed article was kept transparent without deformation.

Another heat resistance test of the thermoformed article was carried out by retort sterilization. In this heat resistance test, water was charged to concave portions of the thermoformed article so that an empty portion of head space became 1 mm in depth and was sealed by a cover composed of PET 12 µm/dry bonding/Al foil 9 µm/dry bonding/PETG 50 µm by heat sealing. The sealed thermoformed article charged with water was subjected to retort sterilization by a hot water-standing retort system at 125° C. for 30 minutes. After cooling, the water was discharged, and transparency and deformation degree were evaluated by visual observation. The transparency was not changed from before the retort sterilization and deformation was not found.

Example 11

The same A-PET sheet 0.6 mm thick (crystallinity: 6.3%, manufactured by ATHENA-KOGYO Co., Ltd.) as Example 2 was stretched by the same stretching machine under the same conditions as Example 2, except that the stretching temperature was 110° C., and the heat-setting roll temperature was 115° C. to obtain a stretched A-PET sheet 0.2 mm thick.

The stretched A-PET sheet was transparent and had no wrinkles. The crystallinity determined by DSC was 28.0%, and no cold crystallization peak was observed.

The stretched A-PET sheet was molded by vacuum-pressure forming using the same apparatus and the same conditions as Example 1, except that the surface temperature heated by the heaters was changed to 110° C., to obtain a thermoformed article.

The thermoformed article kept the transparency of the stretched A-PET sheet, and had a shape in accordance with the mold without deformation. The crystallinity was 33.0%.

The thermoformed article was subjected to a heat resistance test under the same conditions as Example 1 and it was found that the thermoformed article was kept transparent without deformation. Another heat resistance test was carried out by retort sterilization under the same conditions as Example 10 and it was found that transparency was not changed from before the retort sterilization and deformation did not occur.

Comparative Example 1

The same A-PET sheet 0.4 mm thick (crystallinity: 6.1%, manufactured by ATHENA-KOGYO Co., Ltd.) as Example 1 was stretched by the same stretching machine under the same conditions as Example 1, except that the draw ratio was 1.8 times to obtain a stretched A-PET sheet 0.22 mm thick.

On the surface of this stretched A-PET sheet, wrinkles were observed. The crystallinity determined by DSC was 15.3% and a cold crystallization peak existed.

The stretched A-PET sheet was molded by vacuum-pressure forming using the same apparatus and the same conditions as Example 1 to obtain a thermoformed article. The thermoformed article was turbid white to a medium degree and its texture was inferior. As to molded conditions, waviness greatly occurred. The crystallinity was 21.5% and, therefore, a heat resistance test of this thermoformed article was not conducted.

Comparative Example 2

The same A-PET sheet 0.6 mm thick (crystallinity: 6.3%, manufactured by ATHENA-KOGYO Co., Ltd.) as Example 2 was stretched by the same stretching machine under the same conditions as Example 1, except that the draw ratio was 5.2 times to obtain a stretched A-PET sheet 0.12 mm thick.

The crystallinity of the stretched A-PET sheet determined by DSC was 29.7% and it crystallized more than Example 1. However, wrinkles which appeared caused by uneven stretching were generated. Since the surface conditions of the stretched A-PET sheet were inferior, vacuum-pressure forming was not conducted.

Comparative Example 3

The same A-PET sheet 0.6 mm thick (crystallinity: 6.3%, manufactured by ATHENA-KOGYO Co., Ltd.) as Example 2 was stretched by the same stretching machine under the same conditions as Example 2, except that the stretching temperature was 80° C. to obtain a stretched A-PET sheet 0.2 mm thick.

The crystallinity of the stretched A-PET sheet determined by DSC was 29.0%, which was almost the same as Example 2. However, the surface smoothness was inferior and a good sheet was not obtained. Since the surface conditions of the stretched A-PET sheet were inferior, thermoforming was not conducted.

Comparative Example 4

The same A-PET sheet as Example 1 was stretched by the same stretching machine under the same conditions as Example 1, except that the stretching temperature was 125° C. and the heat-setting roll temperature was 130° C. to obtain a stretched A-PET sheet 0.13 mm thick.

The crystallinity of the stretched A-PET sheet determined by DSC was 27.8%. The stretched A-PET sheet was inferior in surface smoothness and whitening occurred. Since the surface conditions of the stretched A-PET sheet were inferior and whitening occurred, thermoforming was not conducted.

Comparative Example 5

The stretched A-PET sheet obtained in Example 2 was used.

The stretched A-PET sheet was molded by vacuum-pressure forming using the same apparatus and the same conditions as Example 1, except that the heat-setting temperature in the mold was 25° C. and the heat-setting time was 60 seconds, to obtain a thermoformed article. Although the thermoformed article was transparent, molding could not be carried out in accordance with the mold. A heat-resistance test of the thermoformed article was not conducted.

Comparative Example 6

The stretched A-PET sheet obtained in Example 2 was used.

The stretched A-PET sheet was molded by vacuum-pressure forming using the same apparatus and the same conditions as Example 1, except that the heat-setting temperature in the mold was 150° C. and the heat-setting time was 20 seconds, to obtain a thermoformed article. Although the thermoformed article was transparent, molding could not be carried out in accordance with the mold. A heat-resistance test of the thermoformed article was not conducted.

Comparative Example 7

The stretched A-PET sheet obtained in Example 2 was used.

The stretched A-PET sheet was molded by vacuum-pressure forming using the same apparatus and the same conditions as Example 1, except that the heat-setting temperature in the mold was 220° C. and the heat-setting time was 5 seconds, to obtain a thermoformed article. The thermoformed article was turbid white to a medium degree and very wavy. A heat-resistance test of the thermoformed article was not conducted.

Comparative Example 8

An A-PET sheet 0.4 mm thick was used.

The A-PET sheet was molded by vacuum-pressure forming using the same apparatus and the same conditions as Example 1, except that the sheet heating temperature was 140° C., the heat-setting temperature in the mold was 25° C. and the heat-setting time was 10 seconds, to obtain a thermoformed article. Although the molded conditions of the thermoformed article was good, it was slightly turbid white. The crystallinity was 13.0%. A heat-resistance test by microwave oven heating was carried out under the same conditions as Example 1 and it was found that the thermoformed article was greatly deformed and whitened.

The results are summarized in Table 1.

TABLE 1

| | Stretching of Sheet | | | | | Thermoforming | |
|---|---|---|---|---|---|---|---|
| | Stretching Temp. (° C.) | Heat-Setting Roll Temp. (° C.) | Draw Ratio | Sheet Conditions *1 | Crystallity (%) | Sheet Heating Temp. (° C.) | Mold Temp. (° C.)/ In Mold Heat-Selting Time (sec) |
| Example 1 | 95 | 100 | 2.6 | ⊚ | 24 | 90 | 180/10 |
| Example 2 | 95 | 100 | 3 | ⊚ | 28.9 | 90 | 180/10 |
| Example 3 | 95 | 100 | 3.7 | ⊚ | 29.1 | 90 | 180/10 |
| Example 4 | 95 | 100 | 3 | ⊚ | 28.9 | 90 | 180/7.5 |
| Example 5 | 95 | 100 | 3 | ⊚ | 28.9 | 110 | 180/10 |
| Example 6 | 95 | 100 | 3 | ⊚ | 28.9 | 90 | 200/10 |
| Example 7 | 95 | 100 | 3 | ⊚ | 28.9 | 90 | 200/7.5 |
| Example 8 | 95 | 100 | 3 | ⊚ | 28.9 | 90 | 170/12 |
| Example 9 | 95 | 100 | 3 | ⊚ | 28.9 | 90 | 170/10 |
| Example 10 | 110 | 115 | 3 | ⊚ | 28 | 90 | 180/10 |

TABLE 1-continued

| | | | | | | | |
|---|---|---|---|---|---|---|---|
| Example 11 | 110 | 115 | 3 | ⊚ | 28 | 110 | 180/10 |
| Comparative 1 | 95 | 100 | 1.8 | ■ | 15.3 | 90 | 180/10 |
| Comparative 2 | 95 | 100 | 5.2 | ■ | 29.7 | — | — |
| Comparative 3 | 80 | 100 | 3 | ■ | 29 | — | — |
| Comparative 4 | 125 | 130 | 3 | ■X | 27.8 | — | — |
| Comparative 5 | 95 | 100 | 3 | ⊚ | 28.9 | 90 | 25/60 |
| Comparative 6 | 95 | 100 | 3 | ⊚ | 28.9 | 90 | 150/20 |
| Comparative 7 | 95 | 100 | 3 | ⊚ | 28.9 | 90 | 220/5 |
| Comparative 8 | A-PET Sheet | | | | 6.1 | 140 | 25/10 |

| | Thermoforming | | | Heat Resistance Microwave Heating | | Heart Resistance Retort Sterilization | |
|---|---|---|---|---|---|---|---|
| | Molded Conditions *2 | Transparency *3 | Crystallity (%) | Deformation Degree *4 | Transparency *5 | Deformation Degree *6 | Transparency *7 |
| Example 1 | ⊚ | ⊚ | 30.5 | ⊚ | ⊚ | | |
| Example 2 | ⊚ | ⊚ | 34.2 | ⊚ | ⊚ | | |
| Example 3 | ⊚ | ⊚ | 34.6 | ⊚ | ⊚ | | |
| Example 4 | ○ | ⊚ | 34.0 | ⊚ | ⊚ | | |
| Example 5 | ⊚ | ⊚ | 34.2 | ⊚ | ⊚ | | |
| Example 6 | ⊚ | ⊚ | 34.9 | ⊚ | ⊚ | | |
| Example 7 | ○ | ⊚ | 33.8 | ⊚ | ⊚ | | |
| Example 8 | ⊚ | ⊚ | 32.5 | ⊚ | ⊚ | | |
| Example 9 | ⊚ | ⊚ | 32.0 | ⊚ | ⊚ | | |
| Example 10 | ⊚ | ⊚ | 33.0 | ⊚ | ⊚ | ⊚ | ⊚ |
| Example 11 | ⊚ | ⊚ | 33.0 | ⊚ | ⊚ | ⊚ | ⊚ |
| Comparative 1 | Δ | Δ | 21.5 | — | — | — | — |
| Comparative 2 | — | — | — | — | — | — | — |
| Comparative 3 | — | — | — | — | — | — | — |
| Comparative 4 | — | — | — | — | — | — | — |
| Comparative 5 | X | ⊚ | — | — | — | — | — |
| Comparative 6 | X | ⊚ | — | — | — | — | — |
| Comparative 7 | Δ | Δ | — | — | — | — | — |
| Comparative 8 | ⊚ | ○ | 13.0 | X | X | — | — |

*1 ⊚ Transparent X Whitened ■ Wrinkle, Surface Roughening, Inferior Surface Smoothness
*2 ⊚ Good ○ Slight Waviness Δ Great Waviness X Cannot Molded
*3 ⊚ Transparent ○ Slight turbid white ΔTurbid white to Medium Degree X Whitened
*4 ⊚ Not Deformed X Deformed
*5 ⊚ Transparent X Whitened
*6 ⊚ Not Deformed X Deformed
*7 ⊚ Not Changed X Whitened Evaluation of Stretched A-PET Sheet The sheet conditions of stretched A-PET sheets were evaluated. In the evaluation, the sheet conditions were evaluated by whitening, wrinkles and surface roughening. The evaluation of "transparent" is that haze measured by JIS K 7105 is 4% or less. Crystallinity was also measured.

Conditions of Stretched A-PET Sheet

Figure 4:
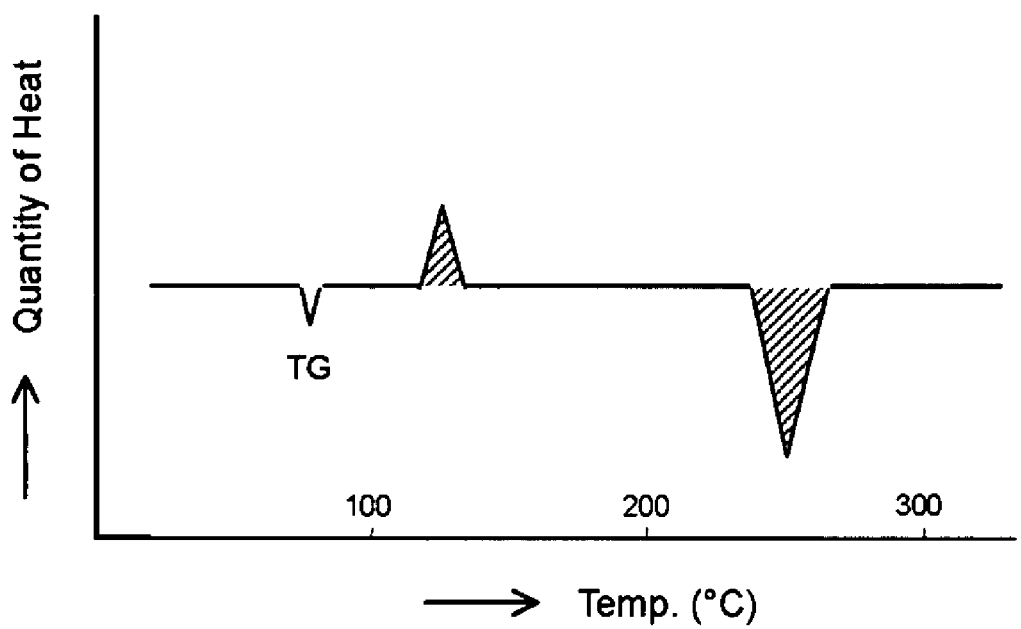
FIG. 4 is a schematic DSC chart.

○ transparent, X whitened, ■ wrinkled surface roughening, inferior surface smoothness Crystallinity The melting behavior of a stretched sheet was measured by a differential scanning calorimeter ("DSC 220", Seiko Denshi). In the measurement, a 10 mg sample was heated at a temperature elevation speed of 10° C./min from 20° C. to 300° C. under nitrogen gas flow at 50 ml/min. A schematic DSC chart is shown in FIG. 4. When elevating the temperature, a small minus peak appears at around 80° C. which indicates the glass transition temperature. Then, a plus peak appears at around 120° C. which indicates a cold crystallization peak and the area shown by diagonal lines represents the quantity of heat of cold crystallization. The minus peak appearing at around 255° C. indicates fusion and the area shown by diagonal lines represents the quantity of heat of fusion, since A-PET is not completely amorphous, partial crystallization occurs while elevating the temperature. The crystallization is called cold crystallization. The crystallinity was determined by the following formula:

$$\text{crystallinity}(\%) = \frac{\left(\begin{array}{c}\text{quantity of heat of}\\ \text{fusion per mole}\end{array}\right) - \left(\begin{array}{c}\text{quantity of heat of cold}\\ \text{crystallization per mole}\end{array}\right)}{\text{quantity of heat of fusion of perfect crystal } PET \text{ per mole } (26.9\,kj)} \times 100$$

Evaluation of Thermoformed Article

The molded conditions and transparency of the thermoformed article were evaluated. The molded conditions were evaluated by the presence of waviness, even at a part of the thermoformed article, and moldability, and when the thermoformed article was molded with the shape in accordance with the mold without any deformation point, the thermoformed article was evaluated good. The transparency was evaluated by visual observation and to keep the transparency prior to thermoforming was good. The other cases were divided into the degree of white turbidity and whitening. In addition, the crystallinity was measured.

Molded Conditions

⊚ good, ○ slight waviness, Δ great waviness, X cannot be molded

Transparency

⊚ transparent, ○ slightly turbid white, Δ turbid white to medium degree, X whitened Crystallinity The same as the case of stretched A-PET sheet.

Heat Resistance of Thermoformed Article

Microwave Oven Heating

A pork cutlet was put on a container-shaped thermoformed article and, after heating by a microwave oven at 700 W for 3 minutes, the deformation degree and transparency of the thermoformed article were evaluated. The temperature of the pork cutlet after heating was 150° C. The transparency was judged by whether the transparency before heating was kept or whitened. The degree of deformation was judged by observing the presence or absence of deformation visually.

Transparency

◎ transparent, X whitened

Degree of Deformation

◎ not deformed, X deformed

Retort Sterilization

Water was charged into a container-shaped thermoformed article so that an empty portion of head space became 1 mm in depth and was sealed by a cover composed of PET 12 μm/dry bonding/Al foil 9 μm/dry bonding/PETG 50 μm by heat sealing. The sealed container charged with water was subjected to retort sterilization at 125° C. for 30 minutes by a hot water-standing retort system. After cooling, the water was discharged and the degree of deformation and transparency were judged by visual observation.

Transparency

◎ not changed from before retort sterilization, X whitened

Degree of Deformation

◎ not changed from before retort sterilization, X deformed

The invention claimed is:

1. A method of making a heat-resistant transparent container which comprises the steps of: performing an initial stretching and heat-setting step in which an amorphous polyethylene terephthalate sheet is heated, initially stretched and then initially heat-set and performing a secondary stretching and heat-setting step in which the sheet treated in the initial stretching and heat-setting step is molded by heating in a mold of a thermoforming machine while secondary stretching is performed followed by secondary heat-setting in the same mold, wherein the initial stretching is uniaxial stretching using treating rolls and carried out at a stretching temperature of 90 to 120° C., a draw ratio of 2.6 to 3.7 times, the initial heat-setting is carried out at a temperature higher than the stretching temperature by 5 to 20° C. through heat-setting rolls which have been heated to a heat-setting temperature while the rotational speed of the heat-setting rolls is 0.5 to 10% slower than that of the treating rolls and the initially stretched sheet is in a stretched form, the treated sheet after the initial stretching and heat-setting step has a crystallinity of at least 22% but less than 30%, the heating in the mold is carried out at a temperature of 80 to 130° C., the secondary heat-setting is carried out at a temperature of 160° C. or higher to form a thermoformed article having a crystallinity of 30% or more.

2. The method of claim 1, wherein the initial stretching is carried out at a stretching temperature of 95 to 110° C.

3. The method of claim 1, wherein said amorphous polyethylene terephthalate sheet prior to said initial stretching and heat-setting step has a crystallinity of approximately 5 to 7%.

* * * * *